Figure 1A:
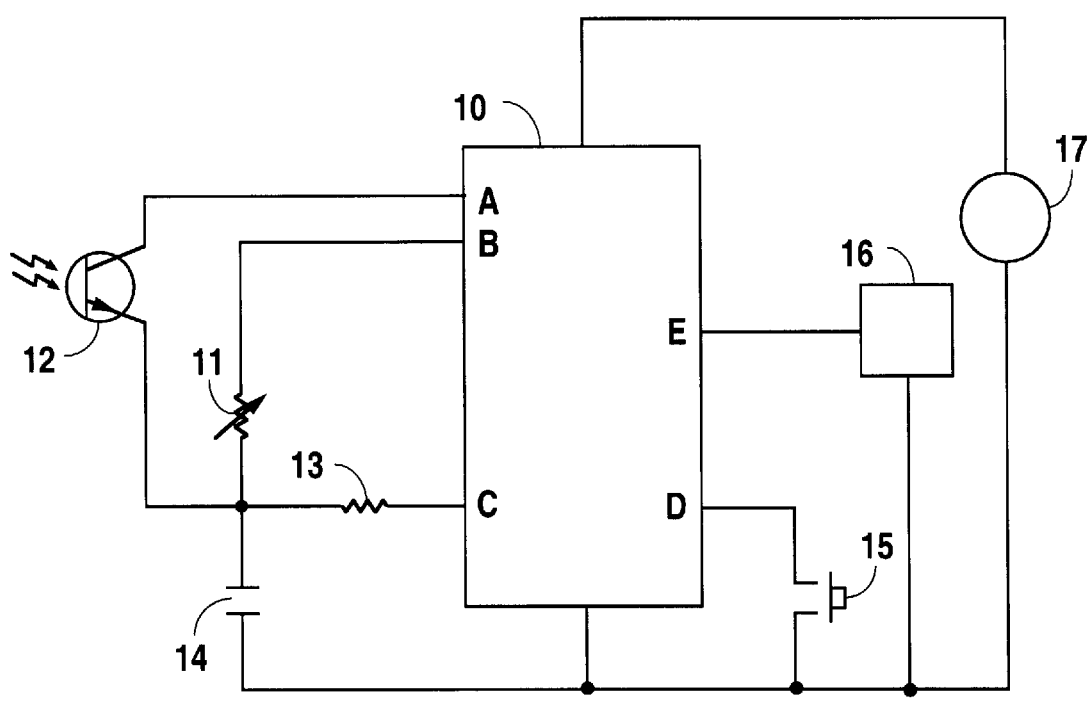

United States Patent [19]

Neumann

[11] Patent Number: 5,808,294
[45] Date of Patent: Sep. 15, 1998

[54] ELECTRONIC CONTROLLER FOR SCHEDULING DEVICE ACTIVATION BY SENSING DAYLIGHT

[75] Inventor: Rodney H. Neumann, Spring, Tex.

[73] Assignee: Kenco Automatic Feeders, San Antonio, Tex.

[21] Appl. No.: 782,414

[22] Filed: Jan. 14, 1997

[51] Int. Cl.$^6$ .................................................. H01J 40/14
[52] U.S. Cl. ................................... 250/214 AL; 315/159
[58] Field of Search ..................... 250/214 AL, 214 R; 315/360, 159

[56] References Cited

U.S. PATENT DOCUMENTS 4,362,970  12/1982  Grady ...................................... 315/159

*Primary Examiner*—Stephone B. Allen

[57] ABSTRACT

A device controller synchronizes a counter to the detection of sunrise or sunset by photoelectrically sensing daylight, thereby establishing an approximate time reference for scheduling the timing of device activations to occur at any time of day or night. An uncalibrated method of measuring sunlight yields more reliable scheduling, relative to sunrise and sunset events. The integral approximate time reference is kept synchronized, even if occasional faults in detection of sunrise or sunset occur. The rules employed to establish and maintain synchronization, and the dynamically variable rules for evaluating changes in light intensity, contribute to the reliable performance of the controller apparatus. Inherently self-adapting and automatic, a potentiometer for setting a time parameter input and a push-button for setting a time parameter input are combined in the apparatus in such a way to yield further utility without complicating the programmability. Additionally, for animal feeder applications, a test mode utilizes a modulates activation of the feed motor to produce audible warning of imminent motor activation.

18 Claims, 7 Drawing Sheets

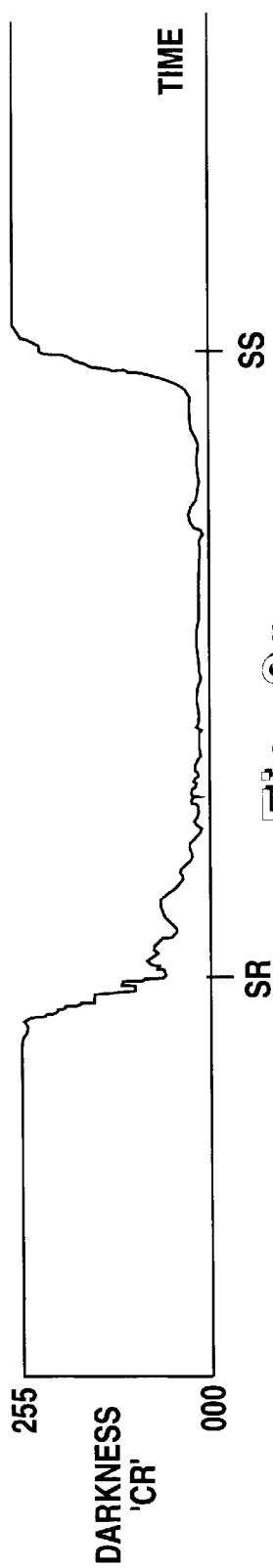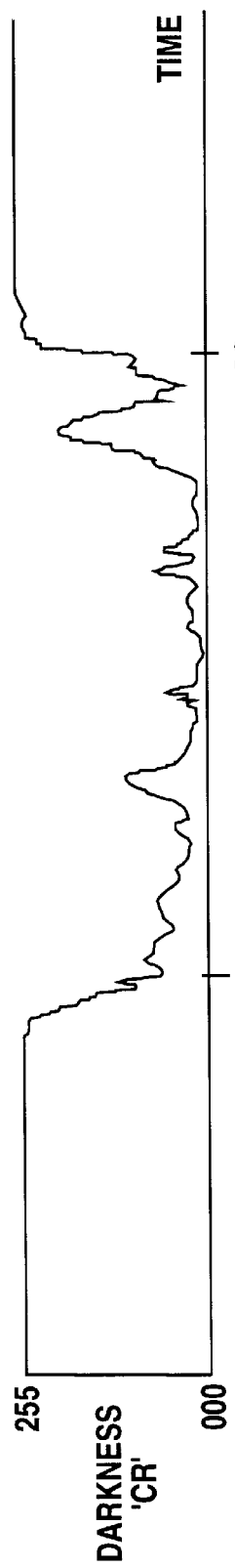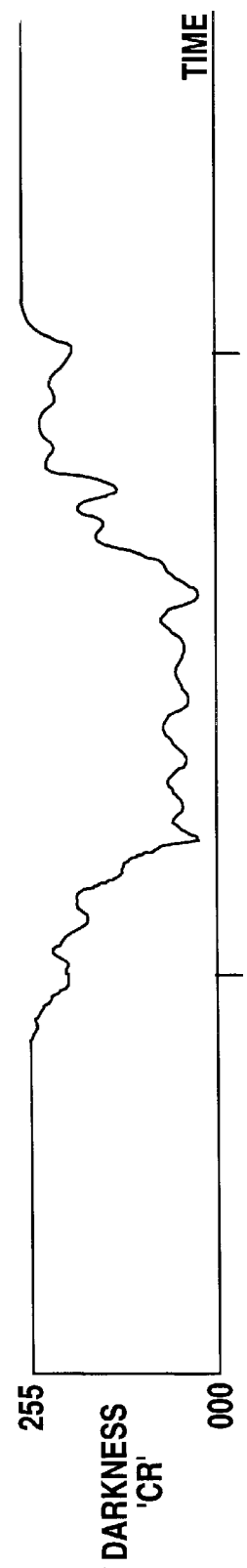

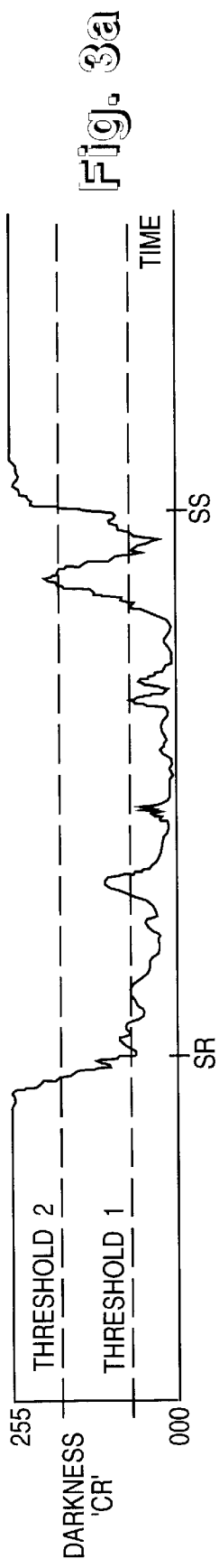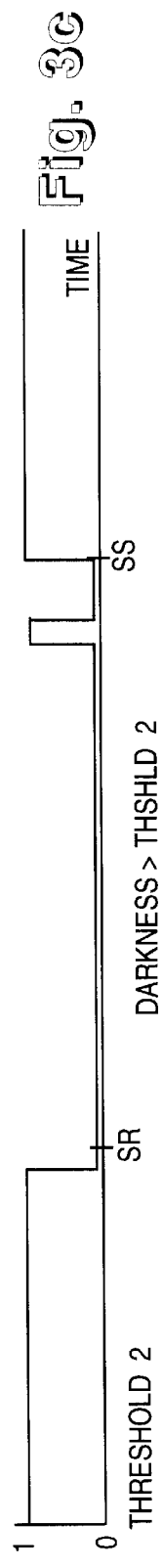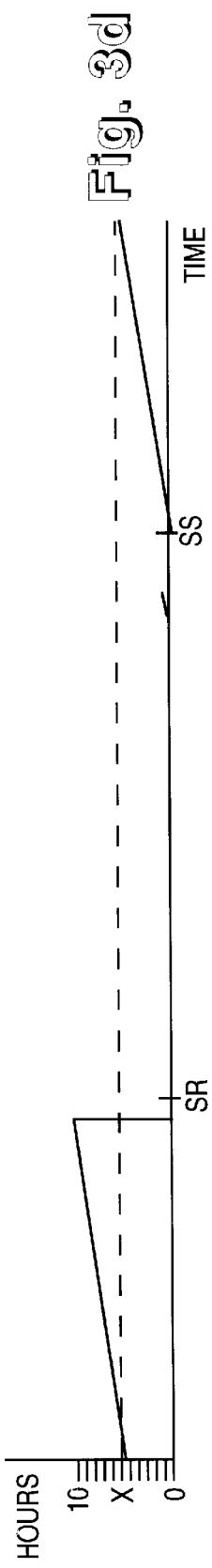

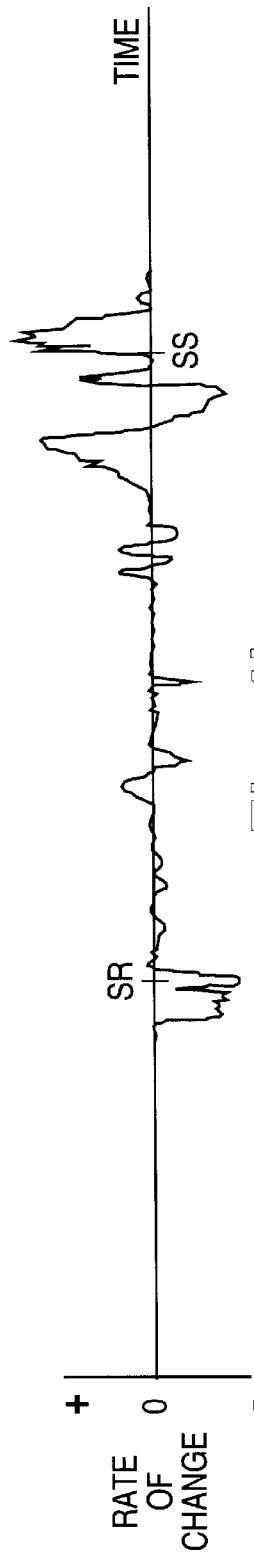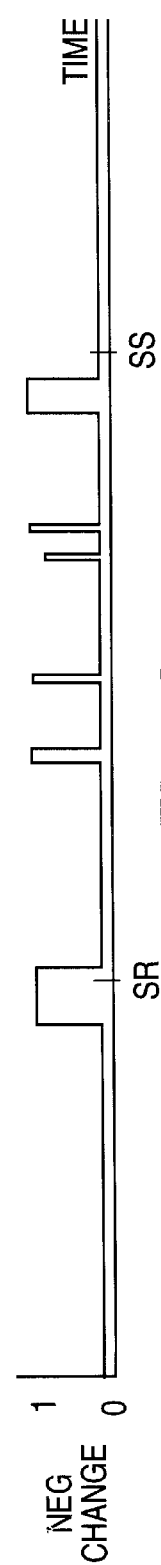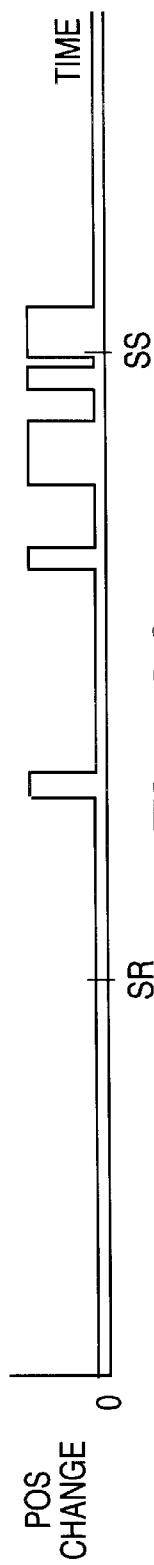

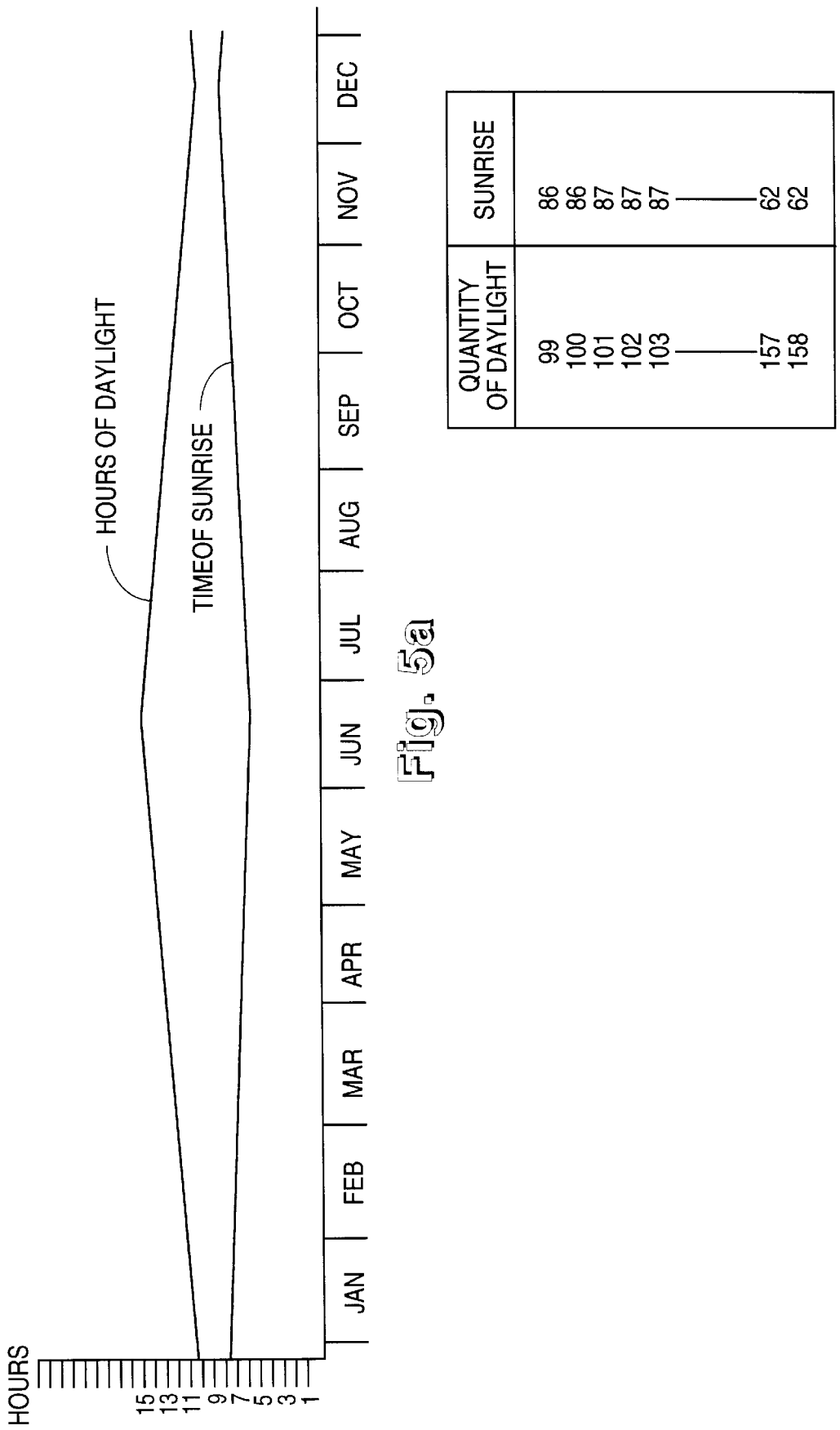

ELECTRONIC CONTROLLER FOR SCHEDULING DEVICE ACTIVATION BY SENSING DAYLIGHT

BACKGROUND

1. Field of Invention

This invention relates to electronic timers and photoelectric controllers used to control electric lighting, activate animal feeders, control irrigation, or other timed control activation apparatus, where daylight sensing is used as a timing cue.

2. Discussion of Prior Art

Electric or electronic timer apparatus often used for controlling devices need to be set with the proper time, both initially and upon replacing a battery or after the time wanders for some reason. In some applications, having to set the time could require that personnel reach inaccessible places.

Another class of device controllers operates on sensing daylight. Where timing is based relative to the amount of ambient daylight, these prior art device controllers do not employ an internal time clock. They rely upon the natural cycle of the day and night. The driving function of these controllers, after all, is the amount of light, not the absolute time.

Photoelectric controls have long been used to sense daylight and activate a switch based upon the amount of light intensity measured by the photoelectric 'eye'. Streetlights and other outdoor lighting have been controlled by employing low-cost circuits. The photoelectric light controls save energy by only activating the lamps when it is dark. Furthermore, it occurs automatically and does not require human intervention.

In the application of prior art utilized for outdoor lighting, there are some disadvantages to the way these controls function. The controls in such lighting employ a delay function so that the lamp is less likely to be falsely started. This works sufficiently well, much of the time. It still occurs that a lamp will be activated when a stormy cloudcover forms temporarily. This occasional occurrence with old methods has an associated cost, and this is a disadvantage of the prior art.

Because of the cost of energy and cost of wear-and-tear on the lamp every time a lamp is started unnecessarily, the cost can be significant over time. For yard lighting, the photoelectric controls are often used with one controller on each lamp in the yard. Since changing the lightbulb may require the utilization of a ladder, the homeowner would appreciate the advantage of increasing the life of the bulb.

Photoelectric controls have also long been used in animal feeder devices. A simple circuit detects light intensity and triggers a motor to run when the light intensity increases over a given threshold, at sunrise. The motor causes feed to be distributed on the ground for game to eat. Similarly at sunset, detection of the decrease in light intensity below a threshold triggers a feeding by activating the feed motor. The prior art typically uses, at most, only three functions:

a. measurement of ambient light intensity;

b. measurement of the rate of change of ambient light intensity;

c. time delay (on the order of time less than one hour).

One disadvantage of this method is that occasionally the feeder will be triggered in response to light intensity changes due to clouds rolling by. This disrupts the feeding pattern, wastes food, and lessens battery life. Another disadvantage is that it is desirable to feed the game before the sun goes down, while there is still ample hunting light. To trigger the feeder based on light intensity alone or change in light intensity, it is impossible to get the circuit to consistently feed a fixed time before the sun goes down. By introducing time delay in the circuit to attempt to reduce the occurrence of false triggers, this results in the sundown feeding occurring after dark. To the hunter, this is a disadvantage.

Sometimes another time delay function is added. There have been some attempts in prior art to cause an animal feeder device to feed before sundown. The intention is to encourage a foraging pattern among the game animals such that they are out during times of ample hunting daylight. While it is desirable to feed game about an hour before sundown, the prior art could not effectively accomplish this. The simplistic method employed in the prior art was to start an electronic timer upon sunrise, which caused a feeding to occur a given fixed amount of hours after sunrise when the timer timed-out. The inferior performance of this prior method is exemplified here. Assume employment of a fixed time delay of 9 hours after sunrise. At some latitude, this may cause the afternoon feeding to occur about an hour before sundown in December, but the feeding would occur six hours before sundown in June.

A similar additional time delay has sometimes been added to photoelectric lighting controls. The added function of keeping lights on for a set period of time, after sunset, has been employed. Adding a fixed time delay function is not affective in providing the service of activating lights one hour before sunrise, for instance. This is another disadvantage of prior art device controllers. The means of anticipation of the event of sunrise or sunset cannot be performed with methods that, previously, only reacted to sunrise or sunset.

Photoelectric light detection has been available for utilization in apparatus, for sixty years. Microelectronics has been available for decades, and the microcontroller has been available for twenty-five years. This invention does not result from material or items that have just very recently become available. Many photoelectric controls used today still use Cadmium Sulfide sensors and bimetallic thermal delay switches. Many other photoelectric controls used today use microelectronics. While some of the prior art applications utilize new technology components, they lack in innovation and novelty, even though their material cost is sufficient to support the methods and construction shown in this invention.

OBJECTS AND ADVANTAGES

My invention employs, among other things, an internal 'clock', as an important method of deriving improvement and new function over previously utilized methods. Scheduling events of device activation and deactivation from the 'clock' instead of directly off the detection of light is key to the advantages which result.

As a result of the internal 'clock', one object is that every sunrise or sunset event does not have to be detected. If the performance of the apparatus does not rely on detection of every sunrise or sunset, the measurement criteria for sunrise or sunset can be increased. Preferably, the method here is to start out with loose criteria for detection, and increase the criteria to a higher level after confidence is secured. Contrasting this concept with prior art: if a sunrise or sunset is not detected, the device activation tied to that event will not be delivered. The tradeoff in the prior art is then to have lower criteria so as to not miss detection of sunrise or sunset. The disadvantage of this is that the prior art, with lower criteria, will trigger activation from false detections, such as cloud activity.

Another object is that events can be scheduled to occur before the detection of sunrise or sunset. Because of the establishment of the internal 'clock', the nominal time of the next sunrise or sunset is 'known' by the apparatus in the present invention. This is an advantage of this invention, to be able to schedule an activation in anticipation of an event of sunrise or sunset instead of in direct reaction to it. Contrarily, in prior art, anticipation of events could not be implemented. Apparatuses of prior art exhibit that the creators of these devices attempted to provide a function of this sort by utilizing a fixed time delay triggered by the direct detection of sunrise or sunset. The fixed time delay does not work because of the mechanics of earth rotation and revolution around the sun.

The earth rotates about its axis that is tilted 22.5 degrees from being at a right angle to the plane of the earth orbit around the sun. If the earth were not tilted, the seasons would not change and the time for sunrise and sunset would be the substantially the same, relative to noon time, all year round, at a given latitude.

For a given latitude the amount of daylight can be calculated for a given day of the year. The maximum amount occurs on the day of the summer solstice and the minimum amount occurs on the day of the winter solstice. The day of nominally equal daylight and nighttime is on the equinox, one day in spring and one day in autumn. The identification of equinox and solstice is independent of latitude. The exception is for northern latitudes where there are several days of daylight or of nighttime, near the solstices.

It is the advantage of this invention that these seasonal drifts in sunrise and sunset do not affect the accuracy of anticipated activations, such as activation one hour before sunset, or such as one hour before sunrise. There is no reliable light sensing indication of sunrise nor of sunset, one hour before it happens. Accordingly, an apparatus of the prior art has no way of anticipating these events on that basis.

The application of these principles to deer feeders result in predictable schedules of feeding at comparable cost of apparatus based on the prior simpler methods. Light activated animal feeders have traditionally been considered products at the low-end of the cost and performance scale when compared with other timer based feeders. However, a very important aspect to be considered is the setting of time of an electronic timer based animal feeder is the same disadvantage as other complex devices in today's world. Many users shy away from electronic devices that require a set up procedure. This is true for digital watches, VCRs, and many other appliances. The light activated animal feeder has the advantage of not requiring set up. The electronic digital clock type feeders have the disadvantage of requiring the operator to go through a sequence of pushing buttons to set the time. The operator has to set the time of each activation and the run-time duration, also, through a sequence of pushing buttons.

Since light activated animal feeders require little or no programming, they should have had a better commercial success. If prior art animal feeder appliances had worked better, they would have been sought-after due to the ease of setting up and inherent lower cost. It is the belief of this inventor that the methods described here, when employed in animal feeders, will greatly improve the desirability of this class of feeder.

In the first part of this section, the first object concerns allowing for more stringent criteria on detection of sunrise and sunset. The methods of more stringent criteria do not include the necessity of accurate light intensity measurement. This is another advantage of this invention. The methods of detection of sunrise and sunset can be accomplished with a simple, low-cost apparatus for converting the light intensity to a numeric value. This method and apparatus of converting analog to digital is yet another object of this invention.

This method of converting analog to digital is also an advantageous way for an operator or user to set a programmable value in the apparatus. It is another object of this invention to use a potentiometer that can be added to the light sensing circuit, for operator input of a parameter such as a delay period. While analog to digital conversion methods of all kinds are well known to those skilled in the art, this particular combination of simple components is novel and advantageous for its low cost in an application that requires only nominal accuracy.

In the case of animal feeders, it is useful to have a push-button on the controller that is used to test the feeder operation. When the operator activates the test push-button, the feeder will run the feed motor for the duration of time for which the controller is programmed. This allows the observation of battery strength, how far the feed will spread, how much feed will be spread, and general operability.

It is advantageous for the controller to wait a few seconds before activating the motor so that the operator has time to stand back. It is yet another object of this invention to have the advantage of combining the use of one push-button for both functions of initiating a test and for setting the motor run-time duration. It is also an object of this invention to use the motor as a sounding device to warn the operator of a pending feed event, so he knows to stand back.

Further objects and advantages of my invention will become apparent from a consideration of the drawings and ensuing description.

DRAWINGS

FIG. 1a: Block diagram of an apparatus for detecting light intensity, with two provisions for time parameter inputs, and switch output for activating a device.

Figure 1B:
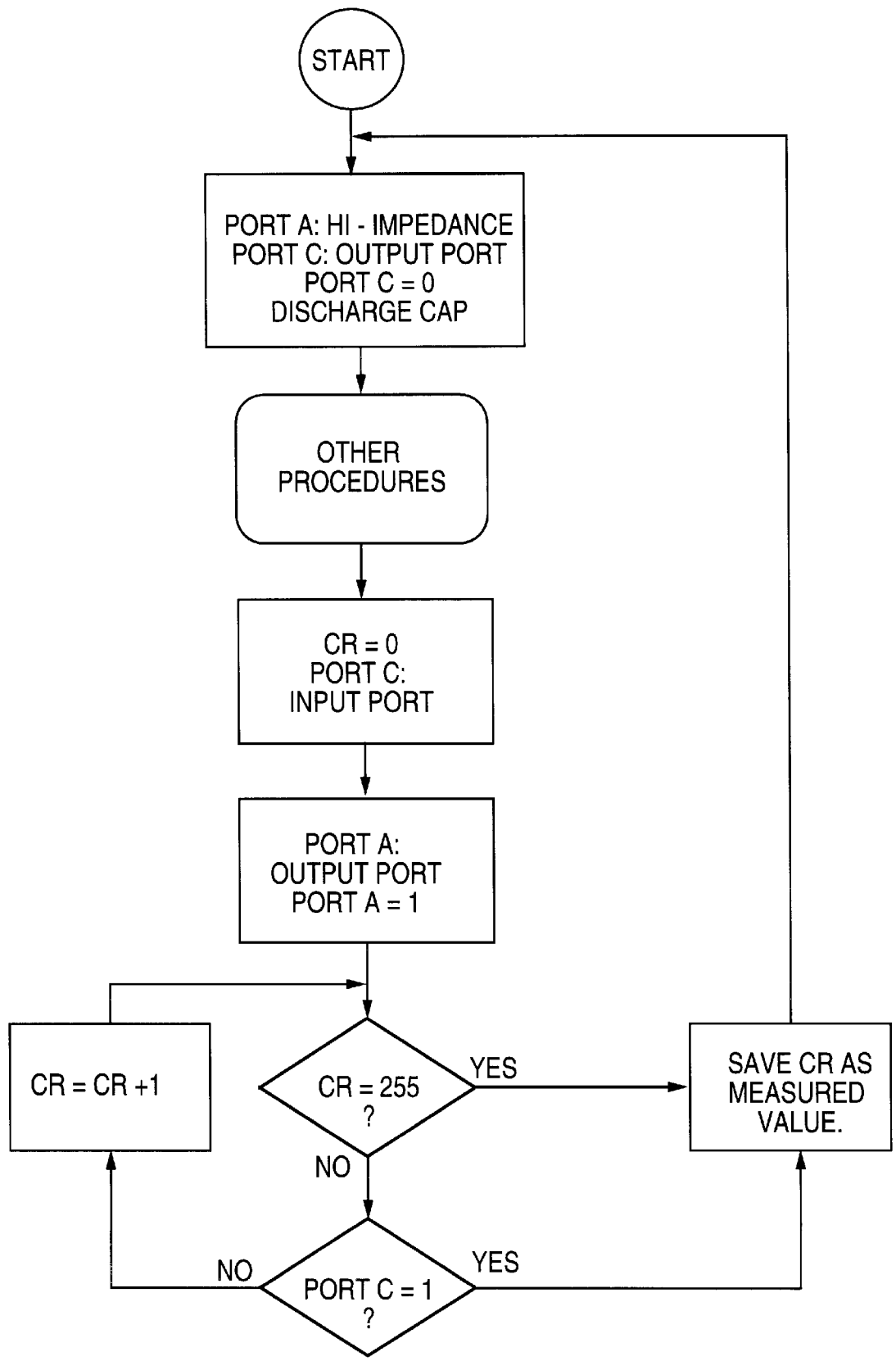

Reference Numerals in FIG. 1a:

10 Microcontroller
11 User accessible potentiometer control
12 Light sensor
13 Resistor
14 Capacitor
15 User accessible push-button switch
16 Switch for activation of device
17 Power supply to circuit FIG. 1b a flow chart illustrating the procedure of obtaining measurement relative to incident light on light sensor and of potentiometer setting, referring to apparatus of figure 1a.

Figure 1C:
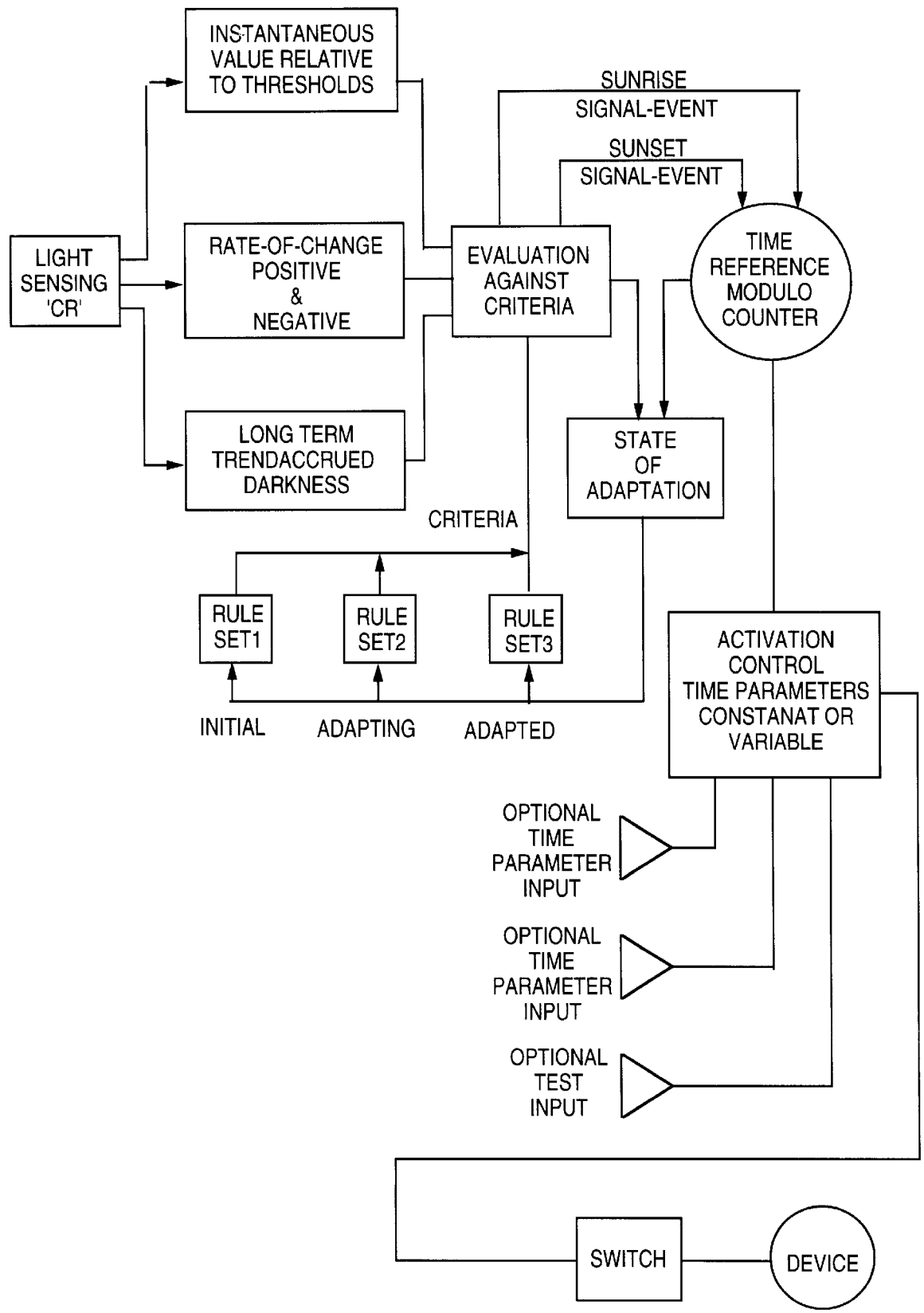

FIG. 1c: Block diagram of interconnection of functional parts of the integrated methods.

FIG. 2a: Graph of counter reading, CR, from procedure of FIG. 1b, plotted versus time, illustrating one day cycle on clear day.

FIG. 2b: Graph of counter reading, CR, from procedure of FIG. 1b, plotted versus time, illustrating one day cycle on cloudy day. FIG. 2c: Graph of counter reading, CR, from procedure of FIG. 1b, plotted versus time, illustrating one day cycle on stormy day.

FIG. 3a: (same as graph in FIG. 2b) with threshold levels shown.

FIG. 3b: Graph of where darkness level on FIG. 3a is greater than threshold 1.

FIG. 3c: Graph of where darkness level on FIG. 3a is greater than threshold 2.

FIG. 3d: Graph of integral of FIG. 3c, or hours of accrued darkness.

FIG. 3e: Graph of where FIG. 3d exceeds given amount of time, or hours of darkness greater than X hours.

FIG. 4a: (same as graph in FIG. 2b)

FIG. 4b: Graph of Rate-of-Change of FIG. 4a.

FIG. 4c: Graph of negative rate-of-change greater than given minimum.

FIG. 4d: Graph of positive rate-of-change greater than given minimum

FIG. 5a: Graph of two plots: duration of daylight throughout year; time of sunrise throughout the year.

FIG. 5b: Look-up table derived from information given in FIG. 5a.

SUMMARY

The benefit of activation of devices, in relationship to the amount of ambient light, is well known in common applications. Controllers of outdoor lighting that activate lights at sunset and deactivate them at dawn, by sensing daylight, are one example. Adding to this basic concept, a delay circuit, a device activation can be made to happen a fixed time after the detection of sunrise or sunset. The lighting can be activated at sunset and turned off a fixed time later.

Utilizing these prior methods, one cannot perform some activation functions that are desired. One example would be to perform an activation one hour before sundown. With the methods of this invention, this can be reliably and repeatedly accomplished. An advantage of this invention is in adding the ability of controlling activation of devices on a daily cycle that is synchronized to the detection of sunrise or sunset. The disadvantage of similar prior art is that each sunrise or sunset is processed as a singular event, and to each one, activation is tightly coupled. In the improved methods shown here, each sunrise or sunset contributes to the adjustment of a 'clock' that is established and maintained by detection of sunrise or sunset. The 'clock' cannot be steered far off by occasional false detections or missing detections of sunrise or sunset. Since activations are based on scheduling from the 'clock', they do not relate directly to the next detection of sunrise or sunset.

These objects and advantages introduced here are due to methods summarily enumerated here:

1. method of maintaining an accumulation of time, or 'clock', synchronous to sunrise or sunset, from which device activations are scheduled relative to sunrise or sunset;
2. method of deriving a representation of approximate real-time-of-day from the 'clock' synchronized to sunrise or sunset, from which device activations are scheduled with respect to approximate real-time;
3. method of detection of the event of sunrise;
4. method of detection of the event of sunset;
5. method of variation of rules for determining detection of sunrise or sunset;
6. method of analog to digital conversion directly from photosensor or potentiometer;
7. method of programming short time duration for activation, by user;
8. method of sounding warning by activation of motor device.

DESCRIPTION OF INVENTION

An embodiment of the light detection apparatus for controlling the activation of a device is given in FIG. 1a. A source of power, 17, supplies electronic circuit 10, which is preferred to be an embedded microcontroller. An appropriate microcontroller for this application could be the brand and model: Microchip PIC16C54. The wires marked A and B on the microcontroller, 10, are digital output ports. The wire marked C on 10 is a port that can be either an input or output, and this sense can be switched dynamically under program control. The wire on 10 marked E is an output port. The wire marked D is an input port to the microcontroller. The FIG. 1a connections show that the output port A is connected to a light sensor, such as a phototransistor, 12, which connects to a capacitor, 14, attached to the common side of the power source. Similarly, connections illustrated show that the output port B is connected to a potentiometer, 11, which connects to the same capacitor 14. At the point where both 12, and 11 connect to the capacitor, another connection to the microcontroller is made to the input/output port C, but through a resistor, 13. The structure of the light sensor, potentiometer, and capacitor, provides the light sensing and potentiometer position sensing part of the apparatus.

FIG. 1a connection from the microcontroller, 10, to the push-button, 15, is provided to illustrate the part of the apparatus for initiating a test or setting a run-time duration of the device to be activated. The device to be activated is controlled by switch, 16, which could be a relay or MOSFET switch, which is in turn connected to wire E from the microcontroller.

FIGS. 2, 3, and 4 are graphs of data plotted against time on a one day cycle. The relationship between these graphs and other descriptions is explained in the operational description section. Structurally, these graphs represent functions of time and are aligned with each other synchronously. The 'SR' and 'SS' hash marks on the time domain are the nominal time occurrences of sunrise and sunset, respectively.

FIG. 1c is a block diagram to illustrate the general functional structure for the operational description. From the left, the light measurement enters as an input function. From the input function follows derivation of the functions illustrated in the graphs of FIGS. 2, 3, and 4. The next block represents the function of evaluation. The information from the derived functions of time is evaluated using a set of rules. A block is shown representing the state of adaptation that defines which set of rules to use for evaluation. The time reference is shown as it is affected by signals representing the event of sunrise or sunset, which result from the evaluation function. The output of the block diagram is the switch that controls the device. The switch is functionally connected to the time reference and the stored activation times and duration times. Human inputs for setting activation time parameters and for test-initiating are shown connected to the activation control function.

OPERATION OF INVENTION

Much of this invention pertains to reliable function while keeping cost low and construction simple. The apparatus and method for obtaining a light intensity reading and an operator input for a time parameter is given. Though other methods of known art can be used, the methods shown here allow for using approximate measurements that are non-linear and uncalibrated. The methods taught here for accruing more data over a few day's times, allows for confident detection of sunrise and sunset with the simple low-cost light detection method, described here.

Refer to FIG. 1a and the flowchart in FIG. 1b. The capacitor 14 is initialized with a condition of zero voltage by discharge through the resistor 13 through operation of the output port C of the microcontroller circuit. Starting from the initial condition of a discharged capacitor, the mode of the port C is changed so that it can be used as an input port. The electrical resistance of light sensing element 12 changes relative to incident light. Microcontroller 10 applies a voltage to the light sensing element through output port A. A current flows through the light sensor in proportion to the resistance of 12, which charges capacitor 14 until the voltage exceeds the threshold on the digital input port C.

FIG. 1b shows, by flowchart, how the counter 'CR' is started at zero and starts counting when the output port A starts applying voltage to the light sensor. Then the counter is stopped when the voltage on the capacitor exceeds the intrinsic switching threshold of the input port C. The resulting value remaining in the counter 'CR' is inversely proportional to the incident light. Under dark conditions, the resistance of the light sensor is not sufficient to raise the voltage on the capacitor to exceed the threshold of input port C. The flow chart indicates that there is a limit of time that will be allowed for timing the charge time. Time that exceeds the limit is defined as too dark to measure. The example of FIG. 1b shows the counter's limit to be 255, which is appropriate for an 8 bit binary value. Therefore, when the program segment returns with CR=255, that is the darkest measurement that it can derive. Returning with CR=0 would indicate the measurement of brightest light. For a particular package, with a particular orientation, and a particular phototransistor, the amount of incident light may never be sufficient to produce a reading of CR=0. Absolute readings would require more tight specifications on the sensing device, leakage current from the microcontroller, and packaging geometry.

In FIG. 1a, the potentiometer 11 is provided as a user control. The user can turn the knob on the potentiometer to select a value to be used by the apparatus. This is shown integral to the circuit just described for light sensing. Under control of the program, as it is flowcharted in FIG. 1b, port B is turned on instead of port A, to cause a value in CR to register the position of the potentiometer. It has not been flowcharted separately because it is simple to describe that the same procedure is followed, using port B instead of A. The result in CR should be 0 when the potentiometer is turned to one end, but CR will probably not be 255 when the potentiometer is turned to the other extreme. It could be made to be if another potentiometer adjustment were added, in series. The main variance is in the leakage current and threshold voltage of the input port of the microcontroller. It is not the intent in this embodiment to have an accurate measurement, but only a nominal one. The selection of the capacitor, 14, and the potentiometer resistance, 11, controls the RC time constant that should be selected so that the maximum setting of resistance on the potentiometer nominally produces the maximum time period that the program will measure. Additional explanation is later provided, on the purpose of the user control for setting a time parameter.

The detection of light can be accomplished with more than one type of sensor. It is common in photoelectric controls to use Cadmium-Sulfide (CdS) sensors. The CdS sensor varies in resistance in inverse proportion to incident light. The spectral characteristic of CdS sensors is broadband. Another sensor technology is the solid state photodiode or phototransitor. The lower cost variety of photodiodes and phototransistors are sensitive to invisible infrared light. Sunlight produces a very large component of Infra-Red (IR) light and so it is of no disadvantage to use an IR sensor instead of a visible light sensor. It is preferred here to utilize an IR phototransistor, because it is very sensitive and not prone to be affected by artificial light, in addition to having a lower cost. A CdS sensor is sensitive to visible light and somewhat to invisible light.

Whether a CdS sensor, photodiode, or phototransistor is used, the common concept is that the resistance through the device varies inversely with exposure to light. With the methods to determine the events of sunrise or sunset taught here, accurate measurement of light intensity is not important. Relative measurement that produces a nonlinear but monotonic translation from light intensity to measured value is generally sufficient for the purposes of this invention. The only absolute requirement is that the minimum level of light that produces a zero value measurement is bounded by some range that can be determined. The determination of this 'dark threshold' depends on the packaging and orientation of the apparatus. Nearby obstructions to sky light, such as buildings and trees, the orientation of the sensor and attenuation due to the package aperture, add up to worst case conditions. Additionally, the minimum amount of light in the spectrum of interest that will be sensed by the sensor with these conditions on the most overcast daylight conditions must be taken into account.

Prior art, not utilizing a digital computational method is at a distinct disadvantage since it would become economically unfavorable to adapt these methods to discrete analog or discrete digital methods. The methods taught here could be utilized in circuits mostly constructed from analog components or a combination of analog and digital components. The methods here could be reduced to art that does not employ a microcontroller circuit. The utilization of techniques that reduce these methods to art, represented by custom integrated circuits, is viable and could be done in such a way as to offer comparable cost advantages. The preferred basis for the apparatus described here utilizes a microcontroller circuit but is not restricted to that construction.

Another method of this invention is in the detection of the event of sunrise and sunset. The method is to continuously acquire samples of light intensity measurement and then to save some of the older samples to compare with more recent samples. From a set of samples collected over a period of several minutes, a trend of change in light intensity can be determined. It can be ascertained whether the light intensity is generally increasing or decreasing and the rate of change can also be ascertained. What is added at this point is what more significantly differs from prior art. At the point where a rapid change of light is measured, this method teaches further determinations to discriminate between what would be sunrise/sunset or what would be a sudden formation or movement of clouds, or a flash from lightning or artificial light.

An additional method is to add the criteria of sustained light intensity before or after the event of rapid change. The method is to devise the circuit or program to evaluate long term trends of light intensity. If a sudden increase in light marks a sunrise, a sunrise will always be preceded by a long period of zero/near-zero light intensity. A sudden increase in light that is not preceded by several hours of zero/near-zero light intensity would be due to change in cloud cover. This additional criterion then produces the advantage of eliminating the false detection of sunrise due to cloud cover changes.

An addition to this method is to require that a rapid increase in light intensity be followed by a given amount of sustained non-zero light intensity. Care must be exercised if the light measurement method is not well calibrated. In the manufacture of competitively priced appliances, it is advantageous to use light detector components that are of the lowest cost and require little or no calibration or evaluation during the production process, as in the example of FIG. 1a. For this reason, some manufactured units will have a much different 'dark threshold' level than others. It is better to avoid criteria based on sustained non-zero light intensity. Sustained zero light intensity is a better criterion since nighttime will always result in measurement of zero light, no matter the 'dark threshold'.

Refer to FIGS. 2a, 2b, and 2c. The result in the counter register, CR, is plotted graphs, against time. Each graph represents a different 24 hour period. FIG. 2a is an example of how light intensity changes on a clear day where the light sensor has very good sensitivity. FIG. 2b is an example of a graph for a day that had some clouds, and probably a stormy formation that cleared up just before sunset. FIG. 2c is an example that illustrates what could be the data that would have to be dealt with on a stormy day, particularly with an apparatus that had a low sensitivity light sensor.

It is not suggested here that the data every day would be as poor as that represented in the graph of FIG. 2c, but it can be like this, occasionally. Light intensity data, as in the graph of FIG. 2b, could 'trick' an apparatus into false interpretation of the rise-in-darkness before sunset. The result could be a false interpretation of the sunset event. If data were always as well behaved as represented in the graph of FIG. 2a, the job of detecting sunrise and sunset would be simplistic.

FIG. 2b graph is used in the analysis shown in the FIG. 3 and FIG. 4 graphs. FIG. 3a graph and FIG. 4a graph are the same as FIG. 2b.

To utilize the criterion of requiring a valid sunrise to be followed by a long trend of non-zero light assumes that the light sensor will not sense very dark daytime periods, due to cloud cover, to appear as long periods of darkness.

The same criteria can be applied in reverse for sunset. Sunset is a rapid decrease in light preceded by an extended period of non-zero light intensity and followed by an extended period of zero/near-zero light intensity. The same warning applies regarding the mistaken measurement of long periods of darkness during daylight. An insufficiently sensitive light sensor in the presence of extended cloud cover can indicate a long period of darkness during daylight.

It is preferred to utilize the criterion of sunrise being preceded by a long period of darkness and sunset being followed by a long period of darkness, than to implement instead, or in addition, criteria based on long periods of daylight. The variance in sensitivity of light sensors, in the manufacturing process, is of less concern if only it must be determined that the sensor has sufficient sensitivity to get a reading of light intensity under what is pre-determined to be the darkest daylight conditions.

The graph, FIG. 3b, indicates the function of comparing the instantaneous value of CR, with threshold 1. Threshold 1 is at a fairly light level. This example exhibited in FIG. 3b shows the sensing of a few events which are not indications of sunset. To avoid this sensing of what could be clouds, FIG. 3c illustrates the results of a darker level threshold. Threshold 2 is set to a level close to absolute darkness, as determined by CR being close to 255. FIG. 3c indicates an event that is not an indication of sunset, but it is better than FIG. 3b. Integration of relatively light periods is not shown, since that is not preferred. Instead, integration of the graph of FIG. 3c yields the function plotted on the graph in FIG. 3d. This graph shows the build up of continuous darkness. Nighttime will always yield an integration, as shown in FIG. 3d, so that the integration will reach some given value. FIG. 3e is a graph which shows the function of time where the accrued darkness has exceeded the given value. At the point when the number of hours of continuous darkness has been reached, a tentative establishment of a time for sunset can be confirmed. This is part of a more stringent criterion. With the stringent criterion, it is not sufficient to have derived one or two facts that appear to be indicative of a sunset event. The confirmation is secured when 'X' hours of continuous darkness follows the tentative sunset indication.

The fact that 'X' hours of continuous darkness is satisfied, as shown in FIG. 3e, is also a stringent requirement for validating the time of sunrise. When the apparatus is first put in service, the moment it starts could be any time of day or night. Therefore, there is not enough history for accruing long term trends. Initially, the rules for determining the time of sunrise or sunset are the instantaneous measurements and short term measurements. After the apparatus has been in service for twenty-four hours, it can evaluate the light sensing data against the more stringent criteria.

The rate-of-change function, well known to those skilled in the art, is also known as the first derivative with respect to time. The derivative of the graph of FIG. 4a is shown in FIG. 4b. Negative excursions of this graph indicate increasing light while positive excursions indicate decreasing light. Flashes of light due to artificial and natural sources may or may not be sensed. Sunrise and sunset exhibit a minimum and maximum rate-of-change characteristic that can distinguish them from changes in light due to clouds. Changes in light due to clouds can exhibit rate-of-change which is in bounds of what is acceptable for detecting sunrise and sunset. Therefore, it is insufficient to consistently detect sunrise or sunset from only the rate-of-change information.

FIG. 4c is a graph which shows negative rate-of-change excursions greater than some minimum. A restriction on duration of the pulses on the graph in FIG. 4c is a method of reducing the number of pulses to be evaluated as a sunrise event. This pulse width restriction is not sufficient by itself to discriminate between actual sunrise and other features. This can be seen in the example graph of FIG. 4c where a negative change pulse occurs near sunset.

Similar observations are made in view of FIG. 4d, a graph of positive rate of change exceeding a given minimum. The more difficult discrimination is the wide pulse, just before the real pulse for sunset. The method to use here, is to save the time of the last positive rate of change that passes the test for amplitude and duration. Then the saved time is validated after 'X' hours of continuous darkness, as explained when discussing FIG. 3d and 3e.

A set of evaluations is listed here:
1. CR>Threshold 2. It is sufficiently dark to be night.
2. CR<Threshold 1. It is sufficiently light to be daylight.
3. Rate-of-change is negative and of sufficient amplitude to be sunrise.
4. Rate-of-change is negative and of sufficient duration to be sunrise.
5. Rate-of-change is positive and of sufficient amplitude to be sunset.
6. Rate-of-change is positive and of sufficient duration to be sunset.
7. Continuous light duration is>X hours.
8. Continuous dark duration is>X hours.

Evaluation of #1 will sometimes give false indications of night during day but will never give false indications of day during night. Evaluation of #2 will not give a false indication of day during night but may give a false indication of night during day. The first evaluation of #3 and #4 in a group, is the closest representation of sunrise. The last evaluation of #5 and #6 is the closest representation of sunset. Evaluation of #7 is undependable because daylight can be interrupted with the effect of storm clouds. Evaluation #8 is reliable because nighttime cannot be interrupted by light that cannot be filtered out by averaging.

A set of rules to employ are exemplified by:

Set 1: Sunset=evaluation #1 preceded by evaluation #6.
Sunrise=evaluation #2 preceded by evaluation #4.
Set 2: Sunset=evaluation #1 preceded by evaluation #5 and #6.
Sunrise=evaluation #2 preceded by evaluation #3 and #4.
Set 3: Sunset=last evaluation #1 preceded by evaluation #5 and #6. followed by evaluation #8.
Sunrise=first evaluation #2 preceded by evaluation #3 and #4, preceded by evaluation #8.

Adaptation rules for advancing to the next set of rules or for returning to a previous set of rules can be developed by one skilled in the art. There are many ways which will work. The questions to answer when devising the rules is in regard to how the apparatus is desired to behave when first initialized. It may be important to see device activations scheduled relative to what the apparatus can best determine to be sunrise or sunset, while it has not yet established a full 24 hour period of experience. Generally, using a simple set of rules initially will produce results no worse than the results of the prior art. Subsequently, performance will immediately thereafter become more reliable and repeatable.

The degree of restrictions placed on determination of sunrise or sunset can be varied to the degree desired by the skilled designer. The objective of this invention is to provide reliable and repeatable control of a device with minimum likelihood of false activations or missing activations. The understanding of how this should function as it applies to the rest of the system is now important to consider. When the apparatus is first put in service at the field site where it will function, it does not yet have the information of what time it is. It also does not yet have information of when sunset last happened or when it will happen, nor with sunrise. The preferred method is that the apparatus begins initially with simple rules of evaluation of the light input and progresses to more stringent rules of evaluation. While in the initial state, the restrictions on rules for detecting sunrise and sunset should be low. The minimum criteria for determining the first event of sunrise or sunset should be utilized. As time progresses, and repeatable information is received by the apparatus, the sunset and sunrise times are reinforced. When the state of the apparatus has reached the adapted state of having reliable indications to predict the next event, the restrictions can be made to have the most severe criteria. It is not disadvantageous at this adapted state of the apparatus to not detect a sunrise/sunset event. The apparatus may coast through that point in time and activate on the assumption that the event happened, even though it did not detect the event.

The method of keeping time in the apparatus can be such that it stays relative to sunrise or sunset or a more complicated method can be used which compensates for seasonal changes so that the time-keeping is approximately synchronous with real time.

An accumulation means for representing time is required which has a range of time representation at least to cover the time between sunrise and sunset. The accumulation means can be implemented by analog methods, where the voltage on a capacitor, for instance, could be representation of time. It is possible to derive the advantage of activation of a device based on time before sunset or a fixed time before sunrise without having the accumulation means have a span of 24 hours or more. An accumulator started at every sunrise detected and stopped at every sunset detected, could result in derivation of an accumulated value that represents some fixed time before sunset. So it is shown that it is not necessary that the accumulation means have a range of a whole day, only the full span of time of daylight or of nighttime. Without the span of a whole day, however, the advantage is lost regarding the allowing for missing or false detections of a sunrise or sunset event.

The preferred method is to represent time accumulation for a span of one day. This is shown with a digital counter of arbitrary modulus, which is likened to a 'clock', and which 'rolls over' once a day.

One construction of a digital counter means for a 'clock' is described here. A microcontroller has a time base from which a counter can be made to count up for each passing of a given interval of time. For example, if an eight bit word is used to represent time, it can represent integer values 0, 1, 2, 3, . . . 254, 255. Adding one to the counter value when it is equal to 255 will cause the counter to go to zero and start over. The nomenclature for this type of counter is a modulo-256 counter or mod256 counter. Desiring the mod256 counter to start over once a day requires that it be incremented by one on a fixed rate given by a period of 5.625 minutes. This period is derived from the calculation: 5.625 minutes times 256=1440 minutes (there are 1440 minutes in a 24 hour period).

It is not important that the time-base of the microprocessor be very accurate since this 'clock' has an opportunity to recalibrate two times a day, with each event of sunrise or sunset. Also, such a 'clock', as described here, is based relative to sunrise. Sunrise changes every day and thus the 'clock' is not useful to indicate accurate time but is useful in providing approximate time relative to sunrise.

To explain further the objective of the mod256 counter example, the methods explained for determination of sunrise are used to determine if a rapid light increase truly is an actual sunrise event. When this occurs the first time, the mod256 counter is reset to zero. If nothing further is done, the next morning, very close in time to the event of sunrise, the mod256 counter will roll-over from 255 to 0. Due to the fact that the sunrise will occur at a different time the next day and due to the fact that the time base for the mod256 counter may have significant inaccuracy, it may be desirable to affect the mod256 counter to adjust it to the latest detection of sunrise by zeroing it again. A more subtle way of keeping the mod256 counter synchronized to sunrise is to increase its count or decrease its count by one count to drive it toward the direction of better synchronization.

Generally, since the granularity of the mod256 counter is about 6 minutes, and since sunrise never changes by more than a few minutes from day to day, at most latitudes, the necessity to correct the mod256 counter by more than one count in one day would indicate a fault or discrepancy. The significance of the discrepancy would be:

1. that the latest detection of sunrise was incorrect;
2. that the previous detection(s) of sunrise were incorrect;
3. that the mod256 counter is running too fast or too slow because of error in the time-base;
4. some other discrepancy due to moving the apparatus location, firmware program bug, or other exception to the norm.

In any of these cases, the best thing to do is reinitialize the evaluation criteria. The evaluation must be substantially started over since there is a conflict in the results of the evaluation.

The mod256 counter could alternatively be zeroed upon sunset, instead of sunrise. It is clear to one skilled in the art to determine how to apply the methods described for synchronizing the mod256 counter to sunset instead of to sunrise.

So far, it has been explained by example how a counter could be made to contain the value zero just at the point after rapid light intensity increase, at sunrise, count up to 255, at 5.625 minutes per count, until it rolls over from 255 to 0. At the point of rollover, it should be very close to one day later, relative to yesterday's sunrise. If sunrise occurred at 6:00AM, and if sunset occurred at 7:00PM, the mod256 counter should have contained a value of 000 at 6AM and a value of about 139 when the sun sets. This is determined from the difference between 7PM and 6AM converted to the number of 5.625 minute intervals:

138.66 counts=(13 hours * 60 minutes/hour)/5.625 minutes/count

If the method of detection of the sunset event described in this invention is utilized, at the point in time where rapid decrease in light intensity is sensed, the mod256 counter value is saved. In the example of a 6AM sunrise and 7PM sunset, the mod256 counter value should be 139. The object of how this saved value of 139 is used to advantage is to allow activation of a device at some time relative to sunset, in this example: one hour before sunset.

The value 139 can be saved as a tentative time of sunset, but not counted as being verified unless the event is followed by a sufficiently long period of darkness. The criterion for this could be that the light level measured after the rapid decrease in light intensity, is zero continuously for six hours. After six hours, the value 139 is saved as the best estimate of the time of sunset using the mod256 counter representation of time.

Particularly, in prior art, a game feeder that was to activate one hour before sunset, was not achieved. The reason was that the prior methods did not employ an internal time representation that spanned anything but a short period of time. An important means taught in this invention is the employment of long term hysteresis, spanning on the order of one day or more. The advantage can be clearly seen in the example given where sunset is anticipated, with confidence, to next occur at time '139' in the mod256 counter. We can activate a device approximately one hour before sunset by triggering activation when the mod256 counter equals the number 139 minus one hour. One hour on the mod256 counter resolves to a count of 60/5.625=10.6. Rounding 10.6 to 11, the firmware program in the microcontroller would subtract 11 from the sunset time of 139, to yield a count of 128. To activate the device when the mod256 counter equals 128 will result in activation very close to one hour before sunset, or 6PM in this example.

This example given is most appropriate for an application of feeding wildlife with a game feeder, and the advantage gained allowing feeding one hour before sunset. A modification of this example in order to show how application could be made to outside lighting is given next.

Supposing it is desirable to turn on parking lot lighting at sunset and to leave them on until five hours after sunset, a similar method could be used of storing a calculated count and activate upon equality with the mod256 counter. Then the lights could be turned on again two hours before sunrise by calculating the count to be compared with the mod256 counter. The sustain time on the lights and the time before sunrise could be fixed in the program or the times could be reprogrammed by various methods easily added by one skilled in the art.

An example of how a potentiometer is 'read' by the microcontroller has been described here, utilizing FIG. 1a and 1b. The relative position of the potentiometer, producing a relative resistance, could represent a relative time. Multiple potentiometers could be included in the design to allow configuration of the apparatus for various turn-on times or turn-off times relative to sunrise or sunset. Other methods of programming times could be used, such as setting digital representations of times with multi-contact switches or communication with the microcontroller from a terminal or computer that would communicate values for programmed times to be stored in the apparatus microcontroller.

The activation of a device could be to turn it on or to turn it off or to turn it on for a given period of time and turn it off In the latter case, the activation time would be determined as previously discussed. The time duration setting could be on the order of a few seconds and may be something that is fixed in the program. Alternatively, the activation duration could be preprogrammed using one the methods described for activation time. Another method could utilize a momentary push-button switch. To set the run time of a game feeder motor, the duration of time that the operator pushes and maintains the switch in a closed position could signal the microcontroller to measure the time duration and save it as the run time for the feed motor.

Another method of keeping a representation of real time in the apparatus of this invention, is a method that keeps the time relative to real time rather than relative to sunrise or sunset. The fact that the earth's axis is tilted makes it so that it is not simple to derive real time from sunrise and sunset times. It would be advantageous if noon were always halfway between sunrise and sunset, but due to the axis tilt, this is not the case. It can be inferred from sunrise and sunset times, where a reference point is, such as noon. Then an approximation of a real time clock can be synthesized from the information. One way to do this would be to utilize the mod256 counter for a clock, as described in the methods already described. Scheduling of the activation of devices is made with reference to the mod256 counter plus an offset. The offset is derived using a method explained next.

The method for deriving an offset that represents the relationship of real-time-of-day to the mod256, is to derive it from the length of daylight measurement. This can be calculated in the microcontroller of the apparatus of this invention, or it can be derived externally and stored in a table in the microcontroller. The sunrise time for a given length of daylight, is latitude dependent. Near the Arctic circle, there are some days when the sun never sets. At the equator, the longest daylight period is much shorter than the longest daylight period at, for instance, a latitude of 30 degrees.

There are two ways to handle this. One is to configure the apparatus for the latitude it is to operate. The other way is for the apparatus to determine what latitude it is on by 'watching' sunrise and sunset over a long period of time. If the apparatus can learn over a long enough period of time, it can determine its latitude, and the day of the year, approximately. It would serve as an approximate clock that never has to be set. Such an apparatus is limited in that it would take a number of days for it to begin to have enough information to approximate its latitude and therefore the application would have to have tolerance for the long adaptation period. To eliminate the adaptation period, the latitude information could be set via switches or could be communicated to the apparatus To determine the calculations for sunrise and sunset times, one skilled in the art of programming microcontrollers can consult astronomical formula text where example programs are given for determining sun rise and sun set times. The calculations can be adapted to run in the apparatus or the sunrise and sunset times can be calculated or obtained from government services. Programs that calculate sunrise and sunset times for given locations are available off the Internet.

For a given latitude, a table of times can be generated that relate sunrise to midnight. The usefulness of this facet of this invention is restricted to cases where approximate time of day is sufficient, not where accurate time is needed.

Refer to FIG. 5a. A span of one typical year is exemplified and two values are plotted. One plotted line is the amount of daylight per day, as it varies throughout the year. The other plotted line is the time between midnight and sunrise, as it varies throughout the year. For a given latitude, or a range of latitudes, this information can be reduced to be represented in a look-up table. FIG. 5b illustrates an example of a look-up table derived from the example plots of FIG. 5a. The look-up table is addressed by an index. The index represents the time of duration of daylight. The value retrieved at that index in the table is used as the offset between the mod256 counter and real-time-of-day.

Described here is how implement this method:

Definitions:
TSR: Mod256 counter value at sunrise (0 in this example).
TSS: Mod256 counter value at sunset.
DL: Measured amount of daylight for the current day, in mod256 units.
MINDL: Minimum amount of daylight for a year, stored in mod256 units. Stored constant.
I: Index into the look-up table.
TABLE(60): table offsets, given in mod256 units from midnight to sunrise. Stored constants.
MOD256: The contents of the MOD256 counter.
TIME: A mod256 representation of approximate real-time-of-day.

Procedure:
1. Measure the amount of daylight in a day: DL=TSS−TSR. Specifically, DL=TSS since TSR=0 by definition of given examples.
2. Subtract the minimum amount of daylight, for the year to produce an index: I=DL−MINDL
3. Fetch the table value stored at the index to use as an offset: OFFSET=TABLE(I)
5. Add offset to mod256 counter to produce real time mod256: TIME=MOD256+OFFSET.

The result is that TIME is approximately equal to real-time-of-day, where:

| 'TIME' | Approximate Real-Time-of-Day |
|---|---|
| 0 | 12:00 AM |
| 64 | 6:00 AM |
| 128 | 12:00 PM |
| 192 | 6:00 PM |
| 255 | 11:54 PM |

In this example, the table represents half a year. The assumption is that the accuracy is sufficient to represent the offsets for one-half of earth's orbit the same as for the other half. Since the mod256 counter has about 6 minute resolution, and since the amount of daylight changes by about 2 minutes per day at my location, the table can be adequately represented with an entry for about every 3 days. The table and minimum daylight time are stored in the microcontroller program memory, in the preferred embodiment. Multiple tables stored for different latitudes permits the apparatus to perform more optimally over a wider geographical range.

Another relevant point is that the approximate real-time-of-day, discussed so far, does not consider the effects of daylight-saving's-time. For daylight saving's time, there is a rule for when the clocks are turned forward one hour and when the clocks are turned back one hour. The best that this can be handled here, while keeping methods practical and simple, is to adjust forward one hour at the Spring equinox, and adjust backward one hour at the Autumn equinox. To determine whether it is Spring or Fall, the trend over several days is measured to determine if days are becoming longer, for Spring, or shorter, for Autumn.

References

1. "Astronomy with your Personal Computer", Peter Duffet-Smith, 1985, Cambridge University Press. ISBN 0 521 31976 5 paperback, ISBN 0 521 26620 3 hard covers.

2. "Astronomical Formulae for Calculators", Jean Meeus, 1985, Willmann-Bell, Inc. ISBN 0 943396 09 3.

I claim:

1. An apparatus for controlling the activation of a device, comprising:
   means for sensing light and producing an output thereof;
   means for converting and processing the output of the means for sensing light to produce a signal nominally coincident with the event of sunrise or sunset;
   an accumulation means including:
      an accumulation value contained therein,
      means for affecting the accumulation value at a fixed rate,
      a maximum accumulation value representative of span of time at least as great as the nominal span of time between sunrise and sunset,
      an associated value representative of the accumulation value at time of sunrise, and
      an associated value representative of the accumulation value at time of sunset;
   means for affecting the accumulation means in response to the signal nominally coincident with the event of sunrise or sunset; and
   means for activating a device wherein the means for activating includes means for comparing the accumulation value to another value or a plurality of values representing a desired time of activation.

2. The apparatus according to claim 1, wherein said accumulation value returns, the next day, to the same value and substantially at the same time, as the previous day.

3. The apparatus according to claim 1, wherein said accumulation means has a digital counter containing a digital value representing said accumulation value.

4. The apparatus according to claim 1, wherein said means of processing light sensing output has a means of comparing said output with a given threshold value.

5. The apparatus according to claim 1, wherein said means of processing light sensing output has a rate-of-change means.

6. The apparatus of claim 5, having a means of comparing output of said rate-of-change means with given value.

7. The apparatus of claim 4, having means of determining a value representing the length of time that output, of said comparing means, remains continuously in a given state.

8. The apparatus according to claim 1, having a means of temporarily saving an accumulation value, nominally coincident with said sunset or sunrise signal, and a means of subsequently validating said saved accumulation value, after a substantially continuous given period of darkness.

9. The apparatus according to claim 1, where said means of affecting accumulation means is to force it to a given value, or to increase of decrease value represented by accumulation means to bring it closer to a given value.

10. The apparatus according to claim 1, having means of selecting rules of evaluation for said means of converting and processing, among simple rules and more complex rules, tending from simple to more complex with respect to how long apparatus has been functioning.

11. The method and apparatus of claim 10, having means of identifying discrepancy and having means of forcing said means of selecting rules to select the more simple rules.

12. The apparatus according to claim 1, having means of producing a value representing an adjustment value associating real-time-of-day to time of sunrise or sunset, where said means uses a value representing measured daylight duration.

13. The method and apparatus of claim 12, where said means of producing said adjustment value is a look-up table which is indexed by daylight duration.

14. The apparatus according to claim 1, having means of calculating a value representing an activation time in terms of said accumulation value, having a given fixed relationship between activation time and time of sunrise or sunset.

15. The apparatus according to claim 1, wherein the varying electrical resistance of the light detection device affects the electrical current charging a capacitance, and a timing means to produce a representation of the time relating to the rate of charging.

16. The apparatus according to claim 1, wherein the resistance of an operator controlled variable resistance device affects the electrical current charging a capacitance, and a timing means to produce a representation of time relating to the rate of charging.

17. The apparatus according to claim 1, further having a means of receiving a signal from a momentary switch, and a means of substantially measuring time-duration of momentary switch activation, and a means of comparing said time duration with period of time nominally less than one second, wherein, if said comparison results in determination of short duration, immediate device activation is forced, and if said comparison results in determination of longer duration, said measured time duration of momentary switch activation is saved as a timing parameter substantially equal to time duration of momentary switch activation.

18. The apparatus according to claim 1, having means of generating a series of short duration device activations in advance of full device activation.

* * * * *